Nov. 18, 1924. 1,515,841
J. M. DAPRON
AIR BRAKE AND SAFETY CAR CONTROL MECHANISM
Filed May 26, 1923 4 Sheets-Sheet 1
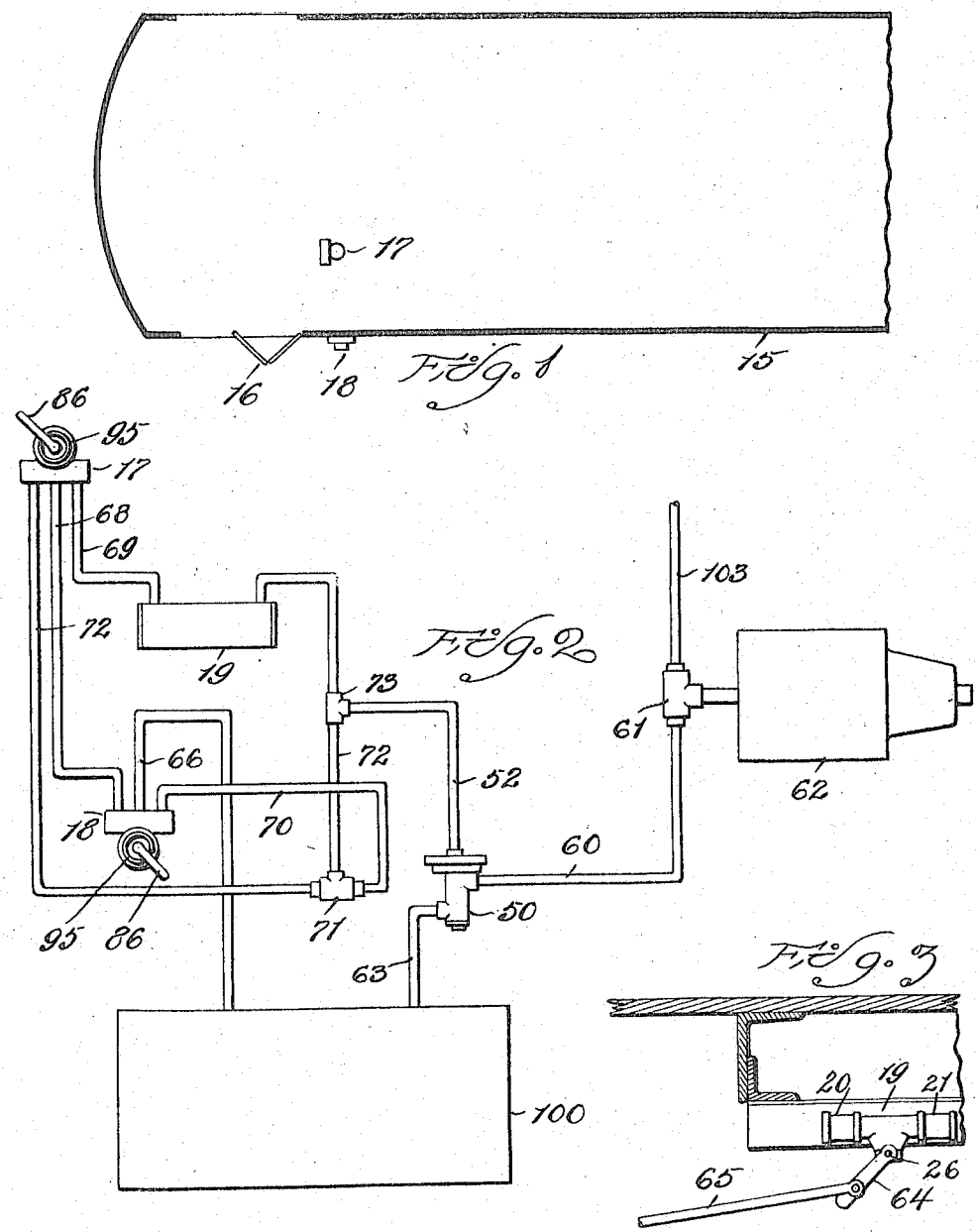
INVENTOR
JOSEPH M. DAPRON,
by James L. Hopkins ATTORNEY.

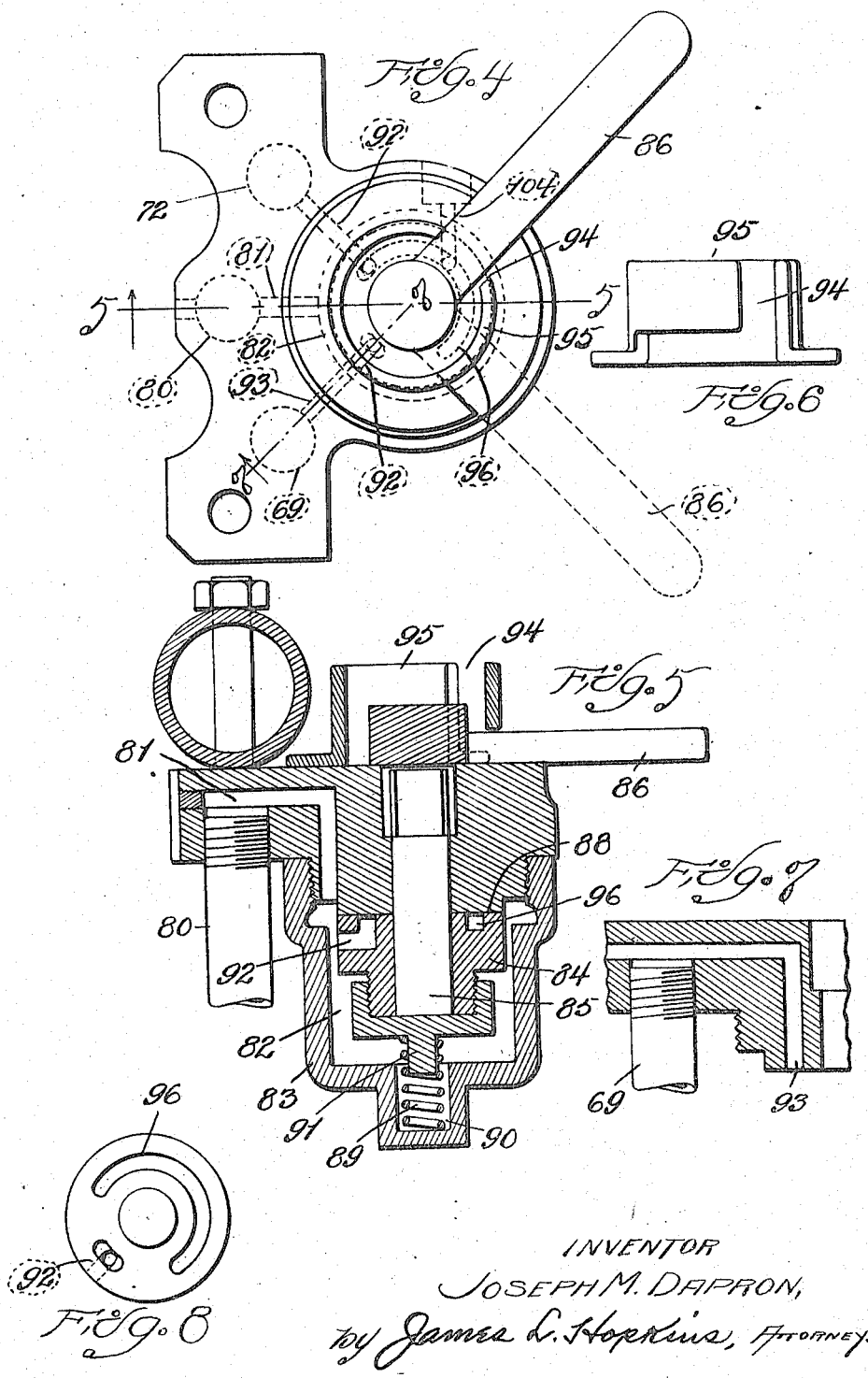

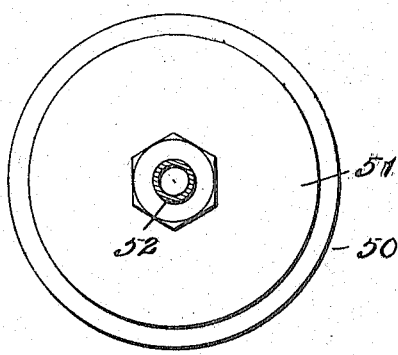
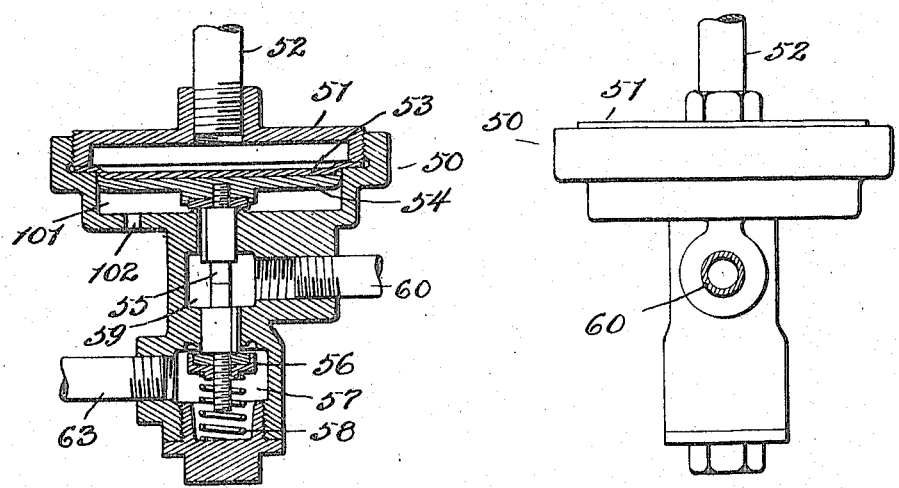

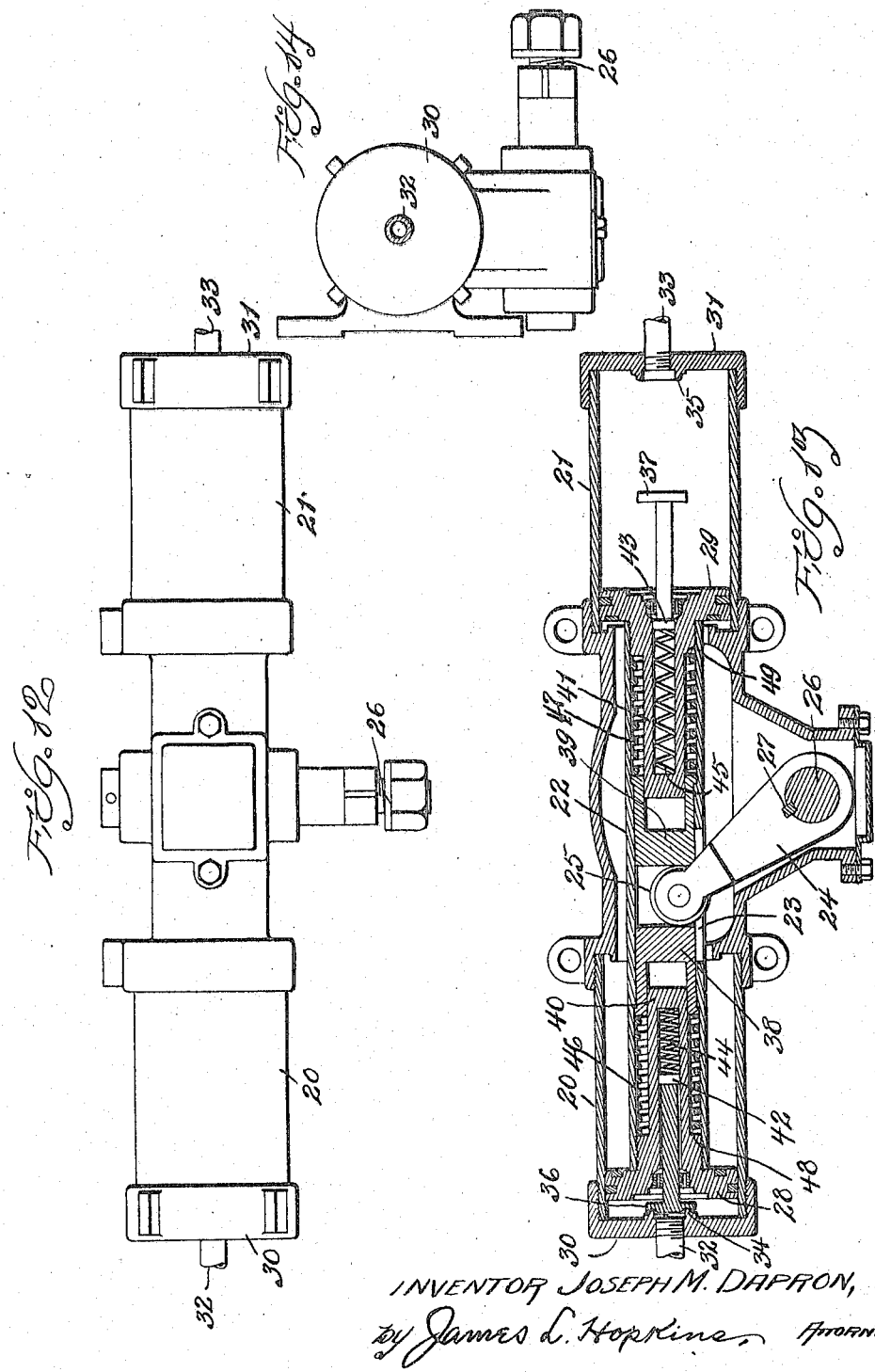

Patented Nov. 18, 1924.

1,515,841

UNITED STATES PATENT OFFICE.

JOSEPH M. DAPRON, OF ST. LOUIS, MISSOURI.

AIR-BRAKE AND SAFETY CAR-CONTROL MECHANISM.

Application filed May 26, 1923. Serial No. 641,790.

*To all whom it may concern:*

Be it known that I, JOSEPH M. DAPRON, a citizen of the United States of America, residing at the city of St. Louis, in the State of Missouri, have invented certain new and useful Improvements in Air-Brake and Safety Car-Control Mechanism, of which the following is a specification, reference being had therein to the accompanying drawing.

My invention relates to improvements in air brake and safety car control mechanism, and has for its object to provide passenger cars with pneumatic door-operating means, operable from within or without the car, in combination with air brake mechanism so arranged that the act of opening the door applies the brakes, and that the brakes can only be released by closing the door.

Other incidents and advantages of my invention will appear from the appended description.

Drawings.

Fig. 1 is a plan view of a car equipped with the mechanism of my invention.

Fig. 2 is a diagrammatic view of the apparatus embodying my invention.

Fig. 3 is a fragmental longitudinal sectional elevation showing the valve and door-connecting rod employed in my invention.

Fig. 4 is a top plan view of the control valve employed in my invention.

Fig. 5 is a vertical mid-sectional view of the same taken on line 5—5 of Fig. 4.

Fig. 6 is a front view of the guard for the control lever used upon the control valves mounted on both the interior and the exterior of the car.

Fig. 7 is a fragmental sectional elevation of the control valve body taken on the line 7—7 of Fig. 4.

Fig. 8 is a plan view of the rotatable valve proper.

Figs. 9, 10 and 11 are respectively top-plan, vertical, mid-sectional, and side-elevation views of the relay valve employed in my apparatus.

Figs. 12, 13 and 14 are respectively bottom-plan, longitudinal sectional, and end views of the door-engine employed in my apparatus.

Description.

In Fig. 1 the passenger car 15 has the hinged-door 16 and is equipped to open said door from the inside. A sliding door may be operated by the same mechanism if desired.

The car 15 has an inside control valve 17 and outside control-valve 18, the valve 17 being operable by a conductor stationed within the car 15, and the valve 18 being operable by a fare-taker stationed outside the car.

The door-engine 19 comprises air-cylinders 20 and 21, a tubular piston-rod 22 (having the slot 23 to admit the crank lever 24 having the roller 25 at its outer terminal, and splined to the shaft 26 by the key 27) and pistons 28 and 29 mounted in said piston-rod 22.

The cylinder-heads 30 and 31, (see Fig. 13) receive the air-pipes 32 and 33 (pipes 69 and 72 in Fig. 2) and have inwardly projecting abutments or nipples 34 and 35 with which the piston heads 36 and 37 alternately engage at the ends of their respective strokes.

Within the tubular piston-rod 22 the thimbles 38 and 39 are slidingly mounted, being socketed respectively upon the bushings 40 and 41, the bores of said bushings 40 and 41 holding the valve-stems 42 and 43 and the co-operating coiled-springs 44 and 45 respectively. The mouths of said thimbles 38 and 39 resting against other coiled-springs 46 and 47 respectively, the outer ends of said coiled springs 46 and 47 being respectively held by the shoulders 48 and 49.

The relay valve 50 has the circular head 51 receiving the air-pipe 52, the flexible diaphragm 53, mounted on the disk 54 seating in the chamber 101, the chamber 101 having an exhaust port 102 and the stem 55 carrying the valve 56; which stem is seated in the chamber 57 and normally held in the position shown in Fig. 10 by the spring 58. In said relay-valve 50 is an intermediate chamber 59 from which extends the brake-actuating pipe 60, communicating through the double-check valve 61 with the brake-cylinder 62 (see Fig. 2).

The chamber 57 receives the pipe 63 leading from the main compressed-air reservoir 100.

The shaft 26 has the arm 64 to which is pivoted the control-rod 65 by which the door 16 is opened or closed. The control valves 17 and 18 are illustrated in detail in Figs. 4, 5, 6 and 7; in which the air-inlet-pipe 80 is identical with either of the pipes 66 or 68 of Fig. 2, and the bore 81 leads from the pipe 80 to the chamber 82 formed within the casing 83. The chamber 82 contains the valve 84 having the stem 85 whose flattened upper terminal receives the removable control-lever 86; the valve 84 being kept seated against the base 88 by the coiled-spring 89, the lower end of said spring 89 being seated in the pocket 90 at the bottom of the chamber 82, and the upper end of said spring 89 surrounding the projection 91 at the bottom of the valve 84.

An L-shaped duct 92 admits compressed air to the door-closing duct 93 and pipe 69; and the control-lever 86 at this stage may be disengaged from the valve-stem 85 and removed entirely through the vertical slot 94 in the collar 95 illustrated in Fig. 6.

In practice the control-lever 86 will always be removed when the conductor or fare-taker leaves his post, and thus the valves 17 and 18 will, with neither of the control-levers 86 in place, be both in registration with the door-closed position of the engine 19, and their portage arranged in registration to permit the opening of the door by replacing the control-lever 86 on either of the valves 17 or 18, and throwing said control-lever 86 to the position shown in dotted lines in Fig. 4, when the arcuate exhaust duct 96 of the valve 84 will connect the inlet-port 97 with the pipe 72, actuating the engine 19 to open the door 16.

Fig. 4 of the drawings shows the bodies of the valves 17 and 18 as being provided each with a duct 81 for the passage of air from the supply pipe 80 to the chamber 82; with ducts 93 and 97 for communication respectively with pipes 69 and 72 which lead to opposite ends of the engine 19 and with a duct 104 leading to atmosphere, and the valve-proper 84 provided with a duct 92 for communication with the chamber 82 and selectively with either the duct 93 or 97 and an arcuate-exhaust duct 96 for selectively registering either duct 93 or 97 with the duct 104.

When the handle is in the position shown by solid lines, air moves from the supply pipe 80, through duct 81 to chamber 82, thence through L-shaped duct 92 to duct 93 and from thence through pipe 69 to one of the ends of the engine 19, at this time the opposite end of the engine is exhausting through pipe 72, duct 97, arcuate exhaust duct 96 and duct 104.

When the handle is thrown to the other position as shown by dotted lines, the duct 92 is brought to register with the duct 97 and thus air moves from the supply pipe 80 through duct 81, chamber 82, duct 92, duct 97 and pipe 72 to the other end of the engine at which time the opposite end of the engine exhausts through pipe 69, duct 93 arcuate duct 96 and duct 104.

The valves 61 and 71 are double-check valves of the usual construction, each having a floating valve which makes it possible for the motorman to open the doors when the handles 87 are removed from the valves 17 and 18, by any motorman (front end) control which will admit air to the brake cylinder supply pipe 103.

Various modifications of the described structural parts are possible without departure from my invention as defined in the claims, the primary object of which is the door-control apparatus cooperating with brake mechanism to the end of applying the brakes contemporaneously with the opening of a door, and keeping said brakes applied so long as any door remains open.

In the door-engine 19 the roller 25 is so cushioned between the thimbles 38 and 39 that the effective throw of the piston-rod 22 in either direction, upon said roller 25, is followed up by pressure from the forward-moving one of said thimbles 38 or 39.

*Mode of operation.*

The pipe 66 extends from the main compressed-air reservoir to the control-valve 18, which control-valve 18 is actuated by the removable hand-lever 86 (see Fig. 4.) The pipe 68 extends to the inner control-valve 17, from which valve 17 the pipe 69 extends to the door-engine 19; pipes 66, 68 and 69 being thrown into communication the engine 19 is actuated to close the door 16. A reverse movement of the valve 18 will put the inlet-pipe 66 in communication with the door-opening pipe 70, through the double-check-valve 71 and pipe 72, to admit pressure to the door-opening end of the engine 19; pressure being at the same time fed through the T-joint 73 and pipe 52 to the valve 50, thrusting the valve 54 downwardly and opening the valve 56, permitting the compressed air in the chamber 57 to flow into the intermediate chamber 59 and through the pipe 60 and valve 61 to the brake-cylinder 62. In this position of the several parts the brakes are applied and held set until the door 16 is closed.

This mechanism provides for a one-man or two man operation of the vehicle, or one man inside with a street-fare-taker at principal traffic points.

I claim:—

1. In a device of the class described, a brake-cylinder; a door-engine; means including a valve for simultaneously supplying pressure to the brake-cylinder to apply the brakes and actuating the door-engine to open a door; with means including mechanism actuating said valve for shutting off the pressure from the brake-cylinder by the operation of closing the door.

2. In a mechanism of the class described, a double control for an air-actuated door-engine comprising an inner control-valve and an outer control valve.

3. In a mechanism of the class described, a double control for an air-actuated door-engine comprising an inner control-valve and an outer control valve, said control valves being each equipped with a control lever removable therefrom only when the valve is in door-closed position.

In testimony whereof I have hereunto affixed my signature.

JOSEPH M. DAPRON.